United States Patent
Herzog et al.

(10) Patent No.: US 11,541,770 B2
(45) Date of Patent: Jan. 3, 2023

(54) VEHICLE POSITIONING FOR INDUCTIVE ENERGY TRANSFER

(71) Applicant: Bayerische Motoren Werke Aktiengesellschaft, Munich (DE)

(72) Inventors: Torsten Herzog, Munich (DE); Armin Wagner, Karlsfeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 622 days.

(21) Appl. No.: 16/601,331

(22) Filed: Oct. 14, 2019

(65) Prior Publication Data

US 2020/0039371 A1 Feb. 6, 2020

Related U.S. Application Data

(63) Continuation of application No. PCT/EP2018/056720, filed on Mar. 16, 2018.

(30) Foreign Application Priority Data

Apr. 18, 2017 (DE) ...................... 10 2017 206 530.3

(51) Int. Cl.
*B60L 53/37* (2019.01)
*H02J 50/90* (2016.01)
(Continued)

(52) U.S. Cl.
CPC ............. *B60L 53/37* (2019.02); *B60L 53/122* (2019.02); *B60L 53/126* (2019.02); *B60L 53/36* (2019.02);
(Continued)

(58) Field of Classification Search
CPC ...... B60L 53/37; B60L 53/122; B60L 53/126; B60L 53/36; B60L 53/38; B60L 2240/24;
(Continued)

(56) References Cited

U.S. PATENT DOCUMENTS 9,631,950 B2 *  4/2017  Raedy ...................... H02J 50/70
9,994,255 B2 *  6/2018  Nakagawa ........... B62D 15/029
(Continued)

FOREIGN PATENT DOCUMENTS

DE    10 2014 223 237 A1    5/2016
DE    10 2016 108 727 A1    11/2016
(Continued)

OTHER PUBLICATIONS

English translation of JP-2012210008A (Description), Yoshida Takashi, Oct. 2012, Panasonic Corp.*

(Continued)

*Primary Examiner* — M Baye Diao
(74) *Attorney, Agent, or Firm* — Crowell & Moring LLP (57) ABSTRACT

A method for bringing a vehicle closer to a vehicle-external primary charging unit configured to inductively charge the vehicle, where the vehicle includes a secondary charging unit, a camera system and a display device, includes the steps of a) capturing a real-time image of a vehicle environment using the camera system, wherein the primary charging unit is included in the real-time image, b) displaying the real-time image on the display device, and c) inserting at least one guide line into the real-time image. The direction and/or curvature of the guide line coincides with a steering angle lock of the vehicle such that the guide line corresponds to the trajectory of the vehicle in the case of the steering angle lock. The position of the at least one guide line in the real-time image of the vehicle environment is selected such that the guide line indicates a movement curve of the secondary charging unit of the vehicle. The method further includes indicating the movement curve of the secondary charging unit relative to the primary charging unit based on a movement of the vehicle by repeating steps a) to c).

12 Claims, 5 Drawing Sheets

(51) Int. Cl.
| | |
|---|---|
| *H02J 50/10* | (2016.01) |
| *B60L 53/36* | (2019.01) |
| *B60L 53/38* | (2019.01) |
| *G01C 21/36* | (2006.01) |
| *B60L 53/122* | (2019.01) |
| *B60L 53/126* | (2019.01) |
| *B60R 1/00* | (2022.01) |
| *B62D 15/02* | (2006.01) |

(52) U.S. Cl.
CPC .......... *B60L 53/38* (2019.02); *G01C 21/3632* (2013.01); *G01C 21/3647* (2013.01); *H02J 50/10* (2016.02); *H02J 50/90* (2016.02); *B60L 2240/24* (2013.01); *B60L 2250/16* (2013.01); *B60R 1/00* (2013.01); *B60R 2300/305* (2013.01); *B60Y 2200/91* (2013.01); *B60Y 2300/91* (2013.01); *B62D 15/0295* (2013.01); *H02J 2310/48* (2020.01)

(58) Field of Classification Search
CPC ............ B60L 2250/16; G01C 21/3632; G01C 21/3647; H02J 7/025; H02J 50/10; H02J 50/90; H02J 2310/48; B60R 1/00; B60R 2300/305; B60Y 2200/91; B60Y 2300/91; B62D 15/0295; Y02T 10/70; Y02T 90/14; Y02T 10/7072; Y02T 90/12
USPC ........................................................ 701/523
See application file for complete search history.

(56) References Cited

U.S. PATENT DOCUMENTS

| | | | | |
|---|---|---|---|---|
| 10,923,967 | B2* | 2/2021 | Klingspor | ............... B60L 53/38 |
| 11,180,036 | B2* | 11/2021 | Saita | ........................ B60L 53/38 |
| 2015/0057932 | A1 | 2/2015 | Nakagawa | |
| 2015/0286880 | A1 | 10/2015 | Itou et al. | |
| 2016/0332575 | A1 | 11/2016 | Fukushima | |
| 2017/0005523 | A1* | 1/2017 | Widmer | ................... B60L 53/38 |
| 2017/0120765 | A1* | 5/2017 | Ichikawa | ................ B60L 53/65 |
| 2018/0056800 | A1* | 3/2018 | Meichle | ............... H04B 5/0037 |
| 2018/0057055 | A1* | 3/2018 | Sol | ........................ B60L 53/126 |
| 2019/0344673 | A1* | 11/2019 | Mühlenhoff | ............. B60L 53/38 |
| 2020/0039372 | A1* | 2/2020 | Saita | ........................ H02J 50/90 |

FOREIGN PATENT DOCUMENTS

| | | |
|---|---|---|
| JP | 2012-206576 A | 10/2012 |
| JP | 2012-210008 A | 10/2012 |
| WO | WO 2010/098397 A1 | 9/2010 |

OTHER PUBLICATIONS

PCT/EP2018/056720, International Search Report dated Jun. 26, 2018 (Three (3) pages).
German Search Report issued in German counterpart application No. 10 2017 206 530.3 dated Dec. 5, 2017, with Statement of Relevancy (Thirteen (13) pages).
Siemens, "Inductive Charging", You Tube, Apr. 19, 2011, one (1) page, XP054978415, URL:https://www.youtube.com/watch?v=drlmBPySz7U.

* cited by examiner

VEHICLE POSITIONING FOR INDUCTIVE ENERGY TRANSFER

CROSS REFERENCE TO RELATED APPLICATIONS

This application is a continuation of PCT International Application No. PCT/EP2018/056720, filed Mar. 16, 2018, which claims priority under 35 U.S.C. § 119 from German Patent Application No. 10 2017 206 530.3, filed Apr. 18, 2017, the entire disclosures of which are herein expressly incorporated by reference.

BACKGROUND AND SUMMARY OF THE INVENTION

The invention relates to a method for bringing a vehicle closer to a vehicle-external primary charging unit suitable for inductively charging the vehicle, wherein the vehicle comprises a secondary charging unit, a camera system and a display device, furthermore a method for positioning a vehicle in a charging position for inductive charging, and also a vehicle configured for carrying out the method for bringing closer or for carrying out the method for bringing closer and for positioning.

Vehicles, in particular vehicles having an electrical drive, comprise chargeable batteries for storing electrical energy. The chargeable battery of a vehicle can be charged e.g. by connection to a vehicle-external current source (e.g. by connection to a public electricity grid). One approach for automatic, wireless, inductive charging of the battery of the vehicle consists in the electrical energy being transferred to the battery from the ground to the underbody of the vehicle by way of magnetic induction via the underbody clearance. This technique is also referred to as wireless energy transfer or wireless charging.

For this purpose, the vehicle comprises a secondary charging unit, which is normally integrated in the underbody region of the vehicle. The secondary charging unit is generally connected to the battery of the vehicle via an impedance matching system and a rectifier. The secondary charging unit can be positioned above a primary charging unit, wherein the primary charging unit is fitted e.g. on the floor of a garage or the ground of a public parking lot. The primary charging unit is usually connected to a power supply. The power supply can comprise a radio-frequency generator that generates an AC current (alternating current) in the primary charging unit, as a result of which a magnetic field is generated. Given sufficient magnetic coupling between primary charging unit and secondary charging unit via the underbody clearance, the magnetic field induces a corresponding current in the secondary coil of the secondary charging unit. The induced current in the secondary charging unit is rectified by the rectifier and stored in an electrical energy store (e.g. in the battery). In this regard, electrical energy can be transferred wirelessly from the power supply to the energy store of the vehicle.

In order to achieve a sufficient magnetic coupling between primary charging unit and secondary charging unit, the secondary coil of the secondary charging unit of the vehicle should be positioned with a certain tolerance (typically±10 cm) above the primary charging unit. The position of the vehicle within this tolerance range is also referred to as the charging position. Reaching the charging position, on account of the comparatively narrow tolerance range in comparison with the dimensions of a vehicle, is a particular challenge for the vehicle driver or for the vehicle in the case of positioning with automated assistance in the charging position. In particular, the maneuverability of the vehicle is comparatively limited in relation to the narrow tolerance range of a few centimeters. This means that even bringing the vehicle closer to the primary charging unit from a distance of the order of magnitude of a plurality of meters from the primary charging unit should be carried out as accurately as possible in order to be able to reach the charging position in an accurately targeted manner.

It is an object of the invention to specify a method for bringing a vehicle closer to a vehicle-external primary charging unit for inductively charging the vehicle, wherein the vehicle comprises a secondary charging unit, a camera system and a display device, a method for positioning a vehicle in a charging position for inductive charging, and also a vehicle configured for carrying out the method for bringing closer or for carrying out the method for bringing closer and for positioning. The intention is for accurately targeted bringing closer and/or positioning to be able to be realized intuitively and quickly for the vehicle driver.

The invention is based on a method and a corresponding vehicle for assisting a driver of the vehicle in bringing the vehicle (and thus the secondary charging unit) closer to the primary charging unit in a distant range. It is only if the bringing closer from said distant range is effected as accurately as possible that ultimately the charging position can be reached quickly at all by means of accurate positioning of the vehicle in a close range of the vehicle with respect to the primary charging unit. In the distant range, the vehicle is at a distance of the order of magnitude of a plurality of meters (at least approximately half a vehicle length) from the primary charging unit. In the close range, the secondary charging unit is at a distance of an order of magnitude of a few meters to centimeters (at most approximately half a vehicle length) from the primary charging unit. Reference points here are the center of the primary coil of the primary charging unit and the secondary coil of the secondary charging unit. The distant range and the close range can also overlap.

Assistance for the vehicle driver in the distant range is particularly important in order to bring the vehicle closer to the primary charging unit as accurately as possible. A good approach position is the basic prerequisite for being able to reach the charging position quickly at all. In other words: the charging position can be reached only if the vehicle actually enters into the close range from the distant range. Therefore, assistance of the vehicle driver is particularly desirable even just for this purpose.

According to the invention, the method comprises the following steps:

capturing a real-time image of the vehicle environment using the camera system, wherein the primary charging unit is included in the real-time image, displaying the real-time image in the display device, inserting at least one guide line into the real-time image, wherein the direction and/or curvature of the guide line coincide(s) with a steering angle lock of the vehicle in such a way that the guide line corresponds to the trajectory of the vehicle in the case of the steering angle lock, and wherein the position of the overlay of the guide line in the real-time image of the vehicle environment is chosen such that the guide line indicates the movement curve of the secondary charging unit of the vehicle, and repeating these steps in order to indicate the movement curve of the secondary charging unit relative to the primary charging unit depending on a movement of the vehicle.

This method involves inserting into a reproduced camera image elements that assist a driver when driving the vehicle such that, with respect to the vehicle relative to the primary charging unit, said vehicle is brought closer from the distant range as accurately as possible. Only in this way is there the possibility that the vehicle can actually assume the charging position in order to achieve effective energy transfer during inductive charging.

The method assists the vehicle driver visually when moving the vehicle along a trajectory selectable exclusively by the driver in order to bring the vehicle closer to the primary charging unit in as accurately targeted a manner as possible. The vehicle itself intervenes in the driver's choice of trajectory neither with regard to the longitudinal axis of the vehicle (x-axis in the vehicle reference system known to the person skilled in the art) nor with regard to the transverse axis of the vehicle (y-axis in the vehicle reference system known to the person skilled in the art).

The at least one guide line gives the vehicle driver an orientation for moving the vehicle as exactly as possible in the direction of the primary charging unit, i.e. for bringing the vehicle closer to the latter. An exact approach should mean as a rule that when the vehicle reaches the edge of the distant range and begins to transition into the close range, the vehicle is situated with the underbody above the primary charging unit, since the secondary charging unit is integrated into the underbody of the vehicle. This is because the secondary charging unit must have the smallest possible offset of a few centimeters in the charging position in the x-direction and y-direction of the coordinate system customary for the vehicle.

Since the guide line, by way of the dependence of its direction and curvature on the steering angle, indicates to the vehicle driver the trajectory not just of the vehicle but in particular of the secondary charging unit of the vehicle, the guide line is suitable for enabling the vehicle driver, by directing the inserted guide line onto the real-time imaging of the primary charging unit, said real-time imaging being registered by the camera system, by means of steering movement, to "sight" the primary charging unit from the distant range and thus to move the secondary charging unit bound to the vehicle directly toward the primary charging unit in an accurately targeted manner. A prerequisite for this is that the relative position of the secondary charging unit with respect to the image excerpt captured by the camera system must be known and the trajectory of the vehicle must be calculable as a function of the steering angle in order to display the guide line in the real-time image. Moreover, the reproduction of the vehicle environment registered by the camera in the display device and the insertion of the at least one guide line must be updated continuously in real time. In the context of this document, real time means that the continuous updating is effected with a repetition rate of less than 1000 ms.

The real-time image registered by the camera can also be displayed in the display device in a modified manner, wherein the modification can consist in the conversion of the image registered by the camera into different viewing angle perspectives. This can be a conversion into a top view. A view from the driver's perspective is preferred, however, wherein the capturing of the image by the camera system should also be effected as far as possible from the passenger compartment with adoption of the driver's perspective.

According to one variant of the method, two parallel guide lines or two guide lines running toward one another are inserted into the real-time image. In the case of two lines running toward one another, the position, inclination and/or curvature of the two guide lines with respect to one another are/is chosen such that in the real-time image the size of the primary charging unit at a specific distance from the vehicle corresponds to the spacing between the two inserted guide lines that is projected into said distance.

Two guide lines have the effect that, using the guide lines, the vehicle driver can head for the primary charging unit even better by the vehicle being moved such that the primary charging unit is situated between the two guide lines. In the case of guide lines running perspectively toward one another, this is possible even more precisely than in the case of parallel lines.

The distance between the two guide lines running toward one another that are inserted into the real-time image is determined by single optical coordination of the distance between the two guide lines with the width of the primary charging unit.

It is furthermore advantageous if orientation lines are inserted into the real-time image in the display device, said orientation lines indicating the width of the vehicle along the trajectory.

Said orientation lines afford the possibility of estimating the dimensions of the vehicle along the inserted guide line. This additionally assists the vehicle driver when positioning the vehicle for example in confined surroundings or when there are obstacles in the surroundings of the vehicle and/or the primary charging unit.

In accordance with one variant of the method, in the case of a vehicle which also comprises a means for determining the position relative to the primary charging unit, the position of the primary charging unit relative to the position of the secondary charging unit is ascertained by the position determining means, and it is registered that the vehicle is situated in a pre-definable distant range with respect to the primary charging unit in order to start the method for bringing the vehicle closer to the primary charging unit in the distant range.

According to this variant, the method for positioning the vehicle is initialized when the vehicle enters a distant range of the vehicle from the primary charging unit. Position determining means of the vehicle are used for this purpose. One such position determining means can be realized by means of the camera system of the vehicle, for instance if it has or is connected to a computing unit on which an image recognition method is implementable. By means of the image recognition method, the primary charging unit can be recognized as an object and be classified as such and its position can be determined. The method for bringing the vehicle closer can then be initialized.

Alternative position determining means are also possible, such as, for instance, a radio-technological means between the vehicle or the secondary charging unit and the primary charging unit, that is to say that the primary charging unit and the secondary charging unit are configured for setting up a radio link. The entry of the vehicle into the distant range can be recognized by virtue of the fact that the radio link between the two charging units can be set up when the vehicle is situated within radio range. Thus, even a rather coarse position determination with a resolution accuracy of the order of magnitude of up to a plurality of meters is sufficient if the intention is merely to ascertain entry into the distant range with respect to the primary charging unit. The radio link can also be configured for data communication between the primary charging unit and the vehicle or the secondary charging unit, such that, for instance, the primary charging unit can communicate position data to the vehicle.

The entry of the vehicle into the distant range can also be recognized by means of GPS if the vehicle has a GPS-enabled positioning system, the exact position of the primary charging unit is known to said positioning system of the vehicle and a distant range around the primary charging unit is defined. Preferably, as soon as the vehicle enters the distant range around the primary charging unit, the real-time image from the camera system and also the insertion are automatically displayed on the display device and the method for positioning is initialized.

A vehicle according to the invention comprising a vehicle-integrated secondary charging unit for inductive charging at a vehicle-external primary charging unit, comprising a camera system and comprising a display device is configured to carry out the method for positioning in the charging position.

It is particularly advantageous if the method for bringing a vehicle closer to the vehicle-external primary charging unit, wherein the vehicle comprises a position determining means, is extended by a method in the close range for the fine positioning of the vehicle into the charging position, in accordance with the following steps, ascertaining the position of the primary charging unit relative to the position of the secondary charging unit by the position determining means, registering that the vehicle is situated in the close range with respect to the primary charging unit, ending the method for bringing the vehicle closer to the vehicle-external primary charging unit, a) displaying a target image on the display device, b) ascertaining the position of the primary charging unit relative to the position of the secondary charging unit by the position determining means, c) inserting a guide element into the target image and inserting a position element into the target image, wherein the position of the guide element and the position of the position element on the target image indicate the ascertained position of the secondary charging unit relative to the primary charging unit, and repeating steps a) to c) in order to indicate a change in position of the secondary charging unit relative to the primary charging unit in the target image depending on a movement of the vehicle.

The method for bringing closer is thus extended by steps for the fine positioning of the vehicle in the close range. Assistance in the positioning of the vehicle is thus ensured for the vehicle driver even in the phase when the primary charging unit—since it is situated in the close range—is hidden to the vehicle driver by the underbody of the vehicle. This method thus assists the vehicle driver not only in the distant range for bringing closer, but also in the close range for positioning the vehicle in the charging position. In this way, the vehicle driver can position the vehicle in an accurately targeted manner for inductive charging as far as possible in one go. The method has the advantage of enabling a simple positionability—implementable by the vehicle driver himself/herself—of the vehicle relative to the secondary charging unit already starting from the distant range up to the fine positioning in the close range.

It is preferred if the position determining means used in this extended method enables a spatial resolution of a few centimeters, since the fine positionability must be ensured. This can be a camera system with an image recognition method. The position of the vehicle relative to the primary charging unit is always determinable unambiguously if the vehicle can determine the position of the primary charging unit at a point in time and is configured to register the trajectory of the vehicle consisting of direction and speed starting from this point in time. For this purpose, the image recognition method is extended by a function which enables not only the object recognition of the primary charging unit as such but also a position determination of the recognized object (distance from the vehicle in a specific direction in the vehicle coordinate system).

Further alternative position determining means are e.g. radio receivers and transmitters, infrared or ultrasonic transmitters and sensors, which are integrated as transmitters and respectively receivers into the vehicle or the secondary charging unit and respectively the primary charging unit (or vice versa). The exact position of the primary charging unit relative to the x-y-axis system of the vehicle is able to be ascertained by way of the transmitted signal intensity relative to the received signal intensity. An evaluation unit can be used for the calculation of the position, which evaluation unit can be integrated in the primary charging unit or in the vehicle. It is also possible to ascertain the position by means of a high-resolution GPS. In this regard, it is sufficient, for example, if the position of the primary charging unit is known and the vehicle is GPS-enabled.

However, preference is given to a radio link between the two charging units at a frequency of 125 kHz. The vehicle is the transmitter and the primary charging unit is the receiver. The specific transmitting device can be installed in the secondary charging unit or separately in the vehicle. The receiver measures the amplitude and the frequency of the radio signal and sends the data back again to the vehicle via a communication channel or via a separate communication link (e.g. WLAN). At the vehicle, the position data are calculated by a computing unit. They are then communicated via CAN to the display and displayed there.

The target image is an optical display on the display device of the vehicle. In accordance with the method, elements are inserted into the target image, which elements assist the driver when driving the vehicle in order to reach the charging position of the vehicle relative to the primary charging unit in the close range.

The target image is automatically inserted when the vehicle enters the close range. This indicates to the vehicle driver that the vehicle has successfully approached the close range and the fine positioning of the vehicle can begin.

As a result of the repeated determination of the position of the secondary charging unit relative to the primary charging unit in the close range and the insertion of guide element and position element—preferably in real time—, the current position of the two charging units with respect to one another is visualized. As a result, the method assists the vehicle driver here in reaching the charging position by virtue of the fact that the guide element and the position element are to be brought "to congruence" in the display device. It is only then that—as required for inductive charging—the charging position is reached. This is done by means of the movement of the vehicle that is instigated by the vehicle driver himself/herself, wherein the vehicle driver orients the movement of the vehicle in the x-y-direction to the position of guide element and position element in the display device.

It is particularly advantageous if the guide element and the position element have an identical geometric basic shape, wherein the guide element has a greater circumference than the position element.

By way of example, both elements can have a ring-shaped, circular, polygonal or elliptic two-dimensional embodiment. The position element is embodied such that it is smaller than the guide element, with the result that the position element can be completely accommodated by the guide element. The vehicle driver is thereby given the impression of a target device, wherein the position element is to be brought into the guide element—as it were into the "target". As a result, the "positioning task" in the close range is particularly intuitive.

According to one variant of the method, the ratio of the circumference of the guide element to the circumference of the position element is chosen such that when the position element is completely encompassed by the guide element in the target image, the vehicle is situated in the charging position, wherein in the charging position the position of the secondary charging unit relative to the primary charging unit has an offset of the secondary charging unit with respect to the primary charging unit in the x-direction and the y-direction of the vehicle, which offset is not greater than a pre-definable or predefined maximum offset.

The charging position is defined by the fact that the offset of secondary charging unit and primary charging unit in the x-y-axis system of the vehicle does not exceed a maximum value, the maximum offset.

The maximum offset is governed by the electromagnetic design of the system comprising secondary charging unit and primary charging unit or the respective electromagnetic coils. A minimum transfer efficiency between primary charging unit and secondary charging unit is ensured in the case of the maximum offset. The maximum offset defines a tolerance range within which the secondary charging unit is situated relative to the primary charging unit in order to adopt the charging position. When the position element is situated in the guide element, the secondary charging unit is situated relative to the primary charging unit in the tolerance range in any case, i.e. the charging position has been reached. Efficient inductive energy transfer is ensured in any case in the charging position. If the position element and the guide element are inserted in the target image such that the position element precisely does not project beyond the region covered by the guide element, this means that the secondary charging unit is situated relative to the primary charging unit indeed at the edge of the tolerance range of the offset in the x-y-direction, but in the charging position. This relationship is the "calibration standard" for position and occupied or bounded area of position element and guide element during the insertion into the real-time image.

Preferably, the guide element and the position element are embodied as ring-shaped or circular, wherein the difference between the diameter of the guide element and the diameter of the position element represents a tolerance measure $R_{Tol}$, and the tolerance measure $R_{Tol}$ correlates with the maximum offset.

In accordance with this embodiment of the method, the guide element and the position element are embodied in ring-shaped or circular fashion, which is to say that the ring of the position element is to be brought into the ring of the guide element in order to reach the charging position. The difference in diameter between the two rings is to scale for the maximum permissible offset of secondary charging unit and primary charging unit in the charging position, i.e. for the maximum offset. The inserted position element and the inserted guide element serve as a "target system" for the vehicle driver. The midpoint of the rings visualizes the electromagnetic midpoint of the coils of primary charging unit and secondary charging unit, i.e. the central coil axis for instance in the case of coils embodied in circular fashion.

The tolerance can also be set in a variable manner in such a way that it can be reduced in the direction of an offset which is less than the maximum offset. It is then possible to move to an even more exact charging position of the secondary charging unit with respect to the primary charging unit. This ensures that the minimum measure of transfer efficiency is increased in this case. It is possible, for instance, for the vehicle driver to choose the tolerance range himself/ herself. In the case of a smaller tolerance measure $R_{Tol}$, the ratio of the circumference and thus the area of the guide element to the circumference and the area of the position element changes toward the value 1. Given the value 1, the position element and the guide element are to be brought exactly to congruence in the target image in order to reach the charging position. Inductive charging is then possible without an offset and with maximum electromagnetic efficiency. The positioning task is the most demanding for this, which also corresponds to the display in the target image, since the position element must be completely encompassed by the guide element. Since both have the same area, this is tantamount to both having to be situated congruently in the target image. Given a value of less than 1, by contrast, just a smaller area of the position element is to be positioned within a larger area, tantamount to a charging position in the x-y-coordinate system with an offset. The function of the area ratios is implementable particularly intuitively with rings or circles. However, other geometric shapes are also suitable.

It is advantageous if the position element is completely encompassed by the guide element in the target image, and the manifestation of the target image and/or the manifestation of the guide element and/or the manifestation of the position element are/is different than when the position element is only partly encompassed or not encompassed by the guide element in the target image, in order to indicate whether or not the vehicle is situated in the charging position.

In this way, as soon as the vehicle has reached the charging position, this is indicated to the vehicle driver by a visual change in the display device. In this case, the vehicle driver is assisted in recognizing that the position element is completely surrounded by the guide element. In this regard, the vehicle driver can position the vehicle in an accurately targeted manner for inductive charging and, as a result of the insertion of the position of secondary charging unit with respect to primary charging unit, recognizes in real time at a glance whether or not the charging position has been reached.

This is very useful during maneuvering, for example, since the display device requires only little attention from the driver in order to recognize the reaching of the charging position.

Alternatively or additionally, when the position element is completely encompassed by the guide element in the target image, an acoustic signal can be reproduced in order to indicate that the vehicle is situated in the charging position. The fact that the charging position has been reached is thus confirmed acoustically to the vehicle driver.

Furthermore, the method can be varied such that the target image is embodied as a top-view image, and a vehicle element is inserted into the target image, wherein the position of the vehicle element in the target image indicates the position of the secondary charging unit relative to the vehicle.

In this case, the vehicle element can be represented as a silhouette of the vehicle in a top view (top view in the customary vehicle coordinate system). In this way, the position of the secondary charging unit with respect to the primary charging unit can be illustrated even more clearly in a manner dependent on the vehicle movement instigated by the vehicle driver. The orientation is facilitated for the vehicle driver since the trajectory to be chosen can be estimated relative to the familiar vehicle dimensions and not just relative to the secondary charging unit. The target image with the inserted vehicle element is preferably oriented in the perspective of the vehicle driver.

It is preferred if the top-view image is an image of the environment of the vehicle which is captured in real time by the camera system and is converted into the top-view image.

Thus, the vehicle driver can recognize in the target image the vehicle environment perceived by the vehicle driver himself/herself and the orientation is facilitated for the vehicle driver.

A vehicle according to the invention comprising a vehicle-integrated secondary charging unit for inductively charging the vehicle at a vehicle-external primary charging unit, comprising a camera system, comprising a display device and comprising a means for determining the position relative to the primary charging unit, is configured to carry out the extended method for bringing the vehicle closer to the primary charging unit in the distant range and also for the fine positioning of the vehicle in the close range into the charging position.

The invention is based on the considerations set out below:

During the inductive transfer of energy, the vehicle-side secondary charging unit and the vehicle-external primary charging unit have to be positioned in a tolerance range with respect to one another. Therefore, the driver has to be assisted in the manual positioning of the vehicle relative to the primary charging unit in order to ensure a best possible positioning of the two charging units with respect to one another. This can be achieved by the use of a camera system and the insertion of auxiliary lines in a display device in a distant range of the vehicle from the primary charging unit and optionally by the insertion of an object representation of the primary charging unit and the secondary charging unit in a close range of the vehicle with respect to the primary charging unit. This affords a positionability of the vehicle that is as simple and intuitive as possible, but also sufficiently accurate, for a vehicle driver.

One preferred exemplary embodiment of the invention is described below with reference to the accompanying drawings. Further details, preferred embodiments and developments of the invention are evident therefrom. Identical reference signs denote identical technical objects. Specifically:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
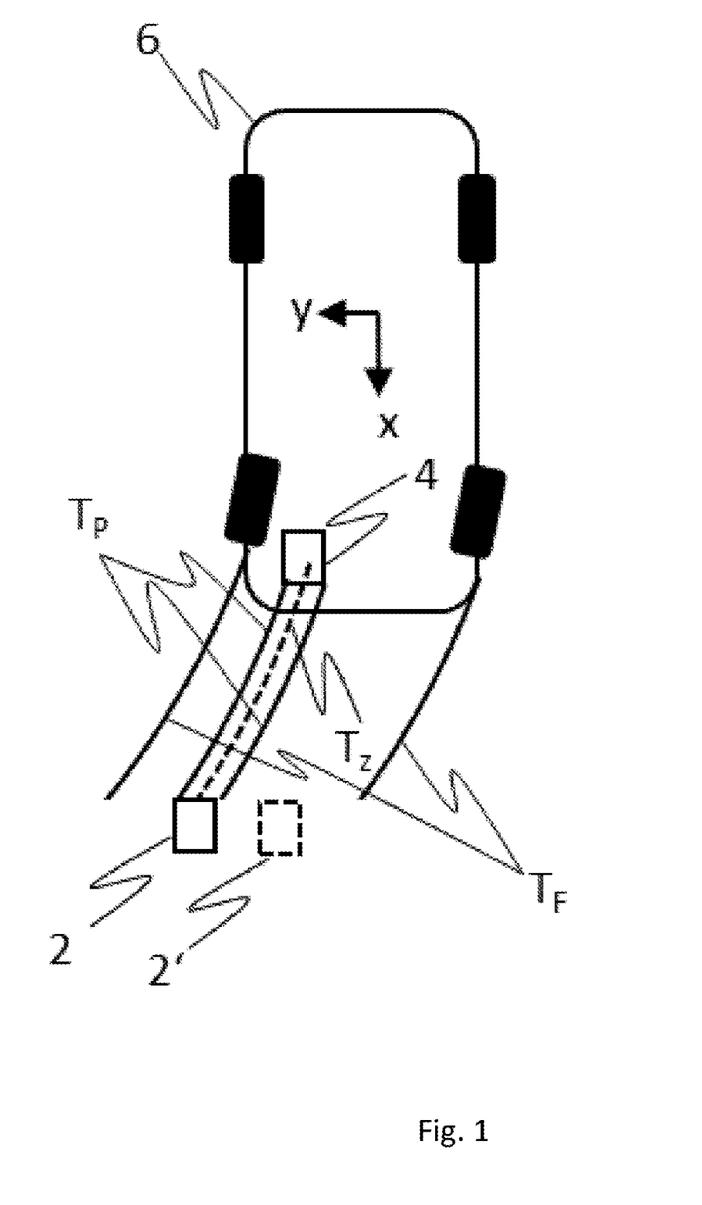
FIG. 1 shows a schematic illustration of the method for bringing the vehicle closer to the primary charging unit.

FIG. 1 schematically shows a vehicle (6) from the view along the z-axis of the vehicle in the vehicle reference system known to the person skilled in the art. In the x-y-plane of the vehicle, a vehicle-integrated secondary charging unit (4) is situated in the region of the underbody of the vehicle. Situated externally to the vehicle near the ground is a primary charging unit (2, 2') for inductively transferring energy from the primary charging unit to the secondary charging unit in order to charge an energy store of the vehicle. The primary charging unit is situated in a manner offset from the secondary charging unit in the z-direction (gap between the underbody of the vehicle and the ground), wherein only a maximum offset of the primary charging unit with respect to the secondary charging unit in the x-direction and y-direction is desired for charging. Therefore, the vehicle should approach the primary charging unit if possible such that the secondary charging unit follows a movement curve $T_z$ along which the primary charging unit moves directly toward the secondary charging unit in the x-y-plane.

Figure 2:
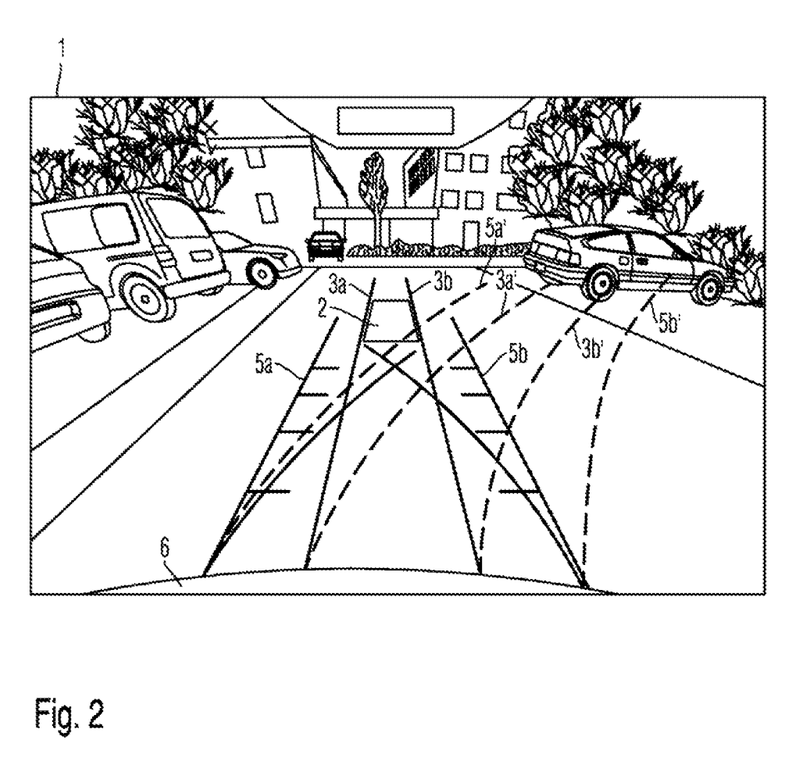
FIG. 2 shows a camera image with registered primary charging unit and with insertion of guide lines in a distant range.

FIG. 2 shows an excerpt from a display device that reproduces a real-time image (1) that is captured by a camera system of the vehicle and is displayed by means of the display device. A vehicle-external primary charging unit (2) is included in the real-time image. The vehicle is situated in a distant range from the primary charging unit. Two guide lines (3a, 3b) are superimposed on the real-time image. The two guide lines reproduce, from a perspective of the driver, the trajectory of the dimensions of the secondary charging unit (see the two curves $T_P$ in FIG. 1) when projected into the distance. Therefore, on the basis of the two guide lines, the driver can "sight" the primary charging unit by changing the steering angle lock. FIG. 1 shows, on the basis of the primary charging unit (2') positioned differently by way of example, how this primary charging unit is missed as a result of an incorrect steering angle lock.

Optionally, two orientation lines (5a, 5b) can additionally be superimposed on the image from FIG. 2. The orientation lines optically indicate to the vehicle driver the trajectory of the vehicle or vehicle dimensions for the steering angle chosen (corresponding to the lines $T_F$ in FIG. 1).

The dependence of the guide lines and of the orientation lines on the steering angle is indicated by the further guide lines (3a', 3b') and orientation lines (5a', 5b') illustrated in a dashed manner in FIG. 2. The superimposition on the real-time image is continuously updated depending on the steering angle. The distance between the two guide lines running toward one another corresponds to the projected size of the registered primary charging unit as a function of the distance from the vehicle. The guide lines assist the vehicle driver here in moving the vehicle in an accurately targeted manner over the primary charging unit by virtue of the fact that it is necessary to steer such that the primary charging unit captured by the camera is sighted using the guide lines during the movement of the vehicle. In this case, the orientation lines indicate the width of the vehicle along the chosen trajectory, thereby facilitating maneuvering under confined conditions or with obstacles.

Figure 3:
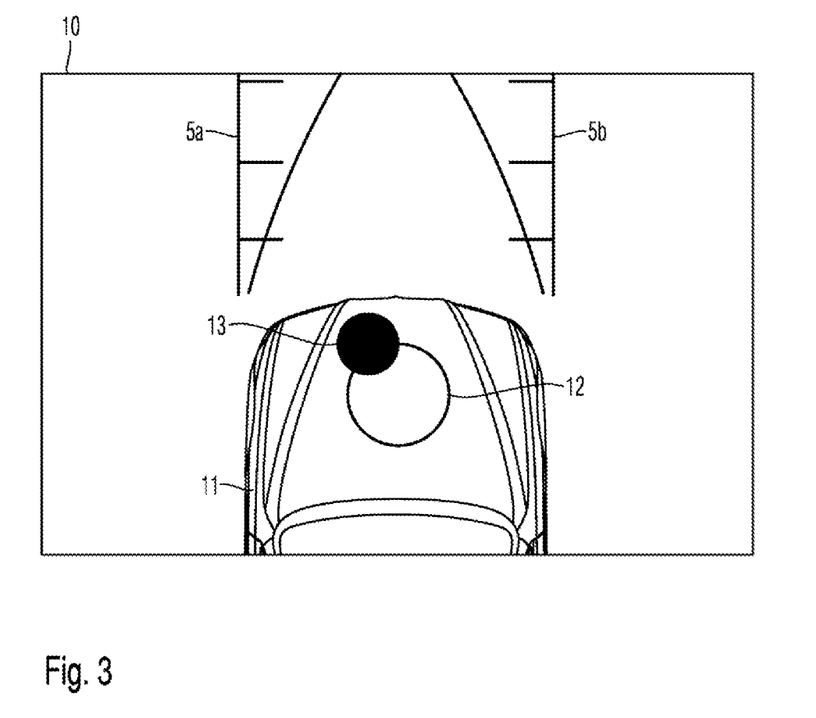
FIG. 3 shows a camera image in a close range with insertion of a position element and a guide element outside the charging position.
Figure 4:
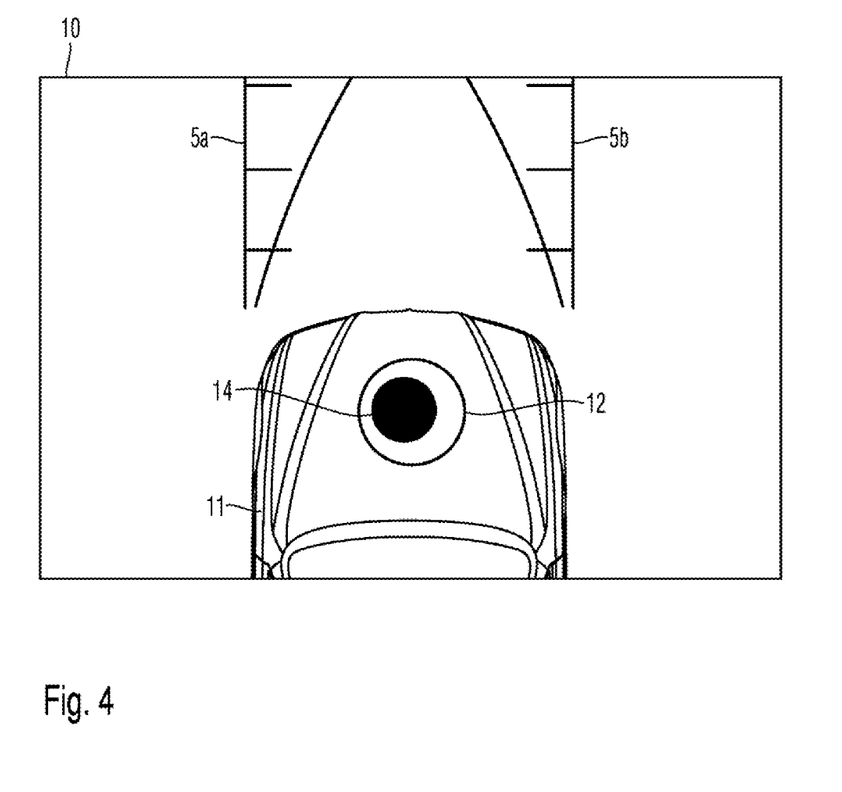
FIG. 4 shows a camera image in a close range with insertion of a position element and a guide element in the charging position.

FIGS. 3 and 4 show an excerpt from a display device that reproduces a real-time image (10) that is captured by a camera system of the vehicle, is converted into a top-view image by a computing unit and is displayed in the top-view image by means of the display device. The vehicle is situated in a close range with respect to the primary charging unit. The entry of the vehicle into the close range is ascertained by means of the radio link between the two charging units. The radio link for determining the position of the vehicle relative to the primary charging unit is one at a frequency of 125 kHz. The transmitter is on the vehicle, and the primary charging unit is the receiver. The specific transmitting device can be installed in the secondary charging unit or separately in the vehicle. The receiver measures the amplitude and the frequency of the radio signal and sends the data back again to the vehicle via a communication channel or via a separate communication link (e.g. WLAN). At the vehicle, the position data are calculated by a computing unit. They are then communicated via CAN to the display and displayed there.

A silhouette of the vehicle (11) and a guide ring (12) indicating the spatial position of the secondary charging unit relative to the vehicle silhouette are inserted into the top-view image. Furthermore, a position ring (13, 14) indicating the spatial position of the primary charging unit is inserted into the top-view image. In the close range, without the vehicle driver himself/herself or the camera system of the vehicle being able optically to recognize the primary charging unit, the vehicle driver can steer the vehicle in an accurately targeted manner over the primary charging unit mounted on the ground by virtue of the vehicle driver moving the vehicle such that the position ring is moved completely into the guide ring in the top-view real-time representation. This is done by constantly ascertaining the positions of the charging units by way of the radio link and updating the top-view image and also the insertions in the display device. According to FIGS. 3 and 4, the filling of the position ring changes the color in order to indicate to the vehicle driver that the charging position has been reached. If the position ring is completely enclosed by the guide ring, it appears with dark filling, otherwise with light filling.

Figure 5:
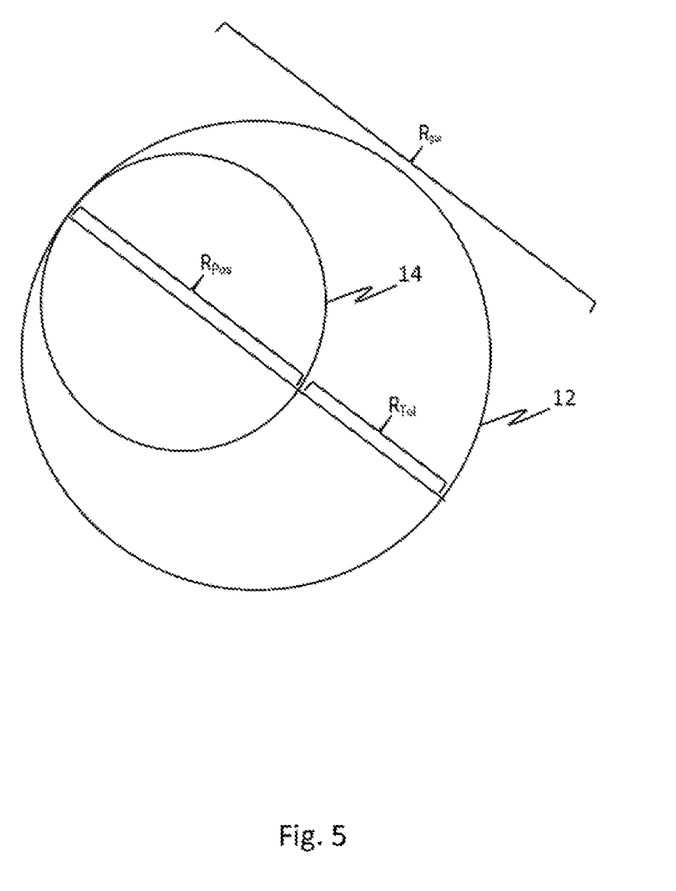
FIG. 5 shows an illustration of the area ratios of ring-shaped position element and ring-shaped guide element for visualizing the tolerance measure $R_{Tol}$.

FIG. 5 shows radii, diameters, circumference and the area of the circular area enclosed by the rings in relation to one another. $R_{gui}$ denotes the diameter of the guide ring, and $R_{Pos}$ denotes the diameter of the position ring. The difference between the two diameters indicates the tolerance measure $R_{Tol}$. The diameters of the rings are chosen such that if the position ring is situated completely within the guide ring, the position of the primary charging unit relative to the secondary charging unit lies in a predefined tolerance range that ensures a sufficient transfer efficiency during the inductive energy transfer. The tolerance range correlates with the tolerance measure $R_{Tol}$, wherein $R_{Tol}$ visualizes the maximum permissible spatial offset of secondary charging unit and primary charging unit in the x-y-plane of the vehicle for the inductive charging. The larger the maximum permissible offset of the system comprising primary charging unit and secondary charging unit, the smaller $R_{Pos}$ can be chosen to be in favor of $R_{Tol}$ in FIG. 5. The area covered by the position ring thus becomes smaller in comparison with the area covered by the guide ring in the real-time image, as a result of which the position ring can be positioned "more easily" in the guide ring. Accordingly, the tolerance range of the offset of primary charging unit and secondary charging unit in the x-y-plane of the vehicle is larger, such that the vehicle can be moved "more easily" into the charging position. The opposite situation obtains in the case of a smaller tolerance range.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for bringing a vehicle closer to a vehicle-external primary charging unit configured to inductively charge the vehicle, wherein the vehicle comprises a secondary charging unit, a camera system and a display device, the method comprising:
    a) capturing a real-time image of a vehicle environment using the camera system, wherein the primary charging unit is included in the real-time image;
    b) displaying the real-time image on the display device;
    c) inserting at least one guide line into the real-time image, wherein
    the direction and/or curvature of the guide line coincides with a steering angle lock of the vehicle such that the guide line corresponds to a trajectory of the vehicle in the case of the steering angle lock, and wherein
    the position of the at least one guide line in the real-time image of the vehicle environment is selected such that the guide line indicates a movement curve of the secondary charging unit of the vehicle; and
    d) indicating the movement curve of the secondary charging unit relative to the primary charging unit based on a movement of the vehicle by repeating steps a) to c);
    wherein the secondary charging unit is a vehicle-integrated secondary charging unit, and wherein the vehicle further comprises a position determining means for determining the position of the secondary charging unit relative to the primary charging unit, wherein the method further comprises:
    1) displaying a target image on the display device;
    2) ascertaining a position of the primary charging unit relative to a position of the secondary charging unit by the position determining means;
    3) inserting a guide element into the target image and inserting a position element into the target image, wherein the position of the guide element and the position of the position element on the target image indicate the ascertained position of the secondary charging unit relative to the primary charging unit; and
    4) indicate a change in position of the secondary charging unit relative to the primary charging unit in the target image depending on the movement of the vehicle by repeating steps 1) to 3).

2. The method according to claim 1, wherein the at least one guide line comprises two guide lines running toward one another, wherein a position of the two guide lines with respect to one another in the real-time image is selected such that, in the real-time image, a size of the primary charging unit at a specific distance from the vehicle corresponds to a spacing between the two guide lines inserted into the real-time image that is projected into said distance.

3. The method according to claim 1, further comprising inserting orientation lines into the real-time image on the display device, said orientation lines indicating a width of the vehicle along the trajectory.

4. The method according to claim 1,
    wherein the guide element and the position element have an identical geometric basic shape, and
    wherein the guide element has a circumference that is greater than a circumference of the position element.

5. The method according to claim 4, wherein
a ratio of the circumference of the guide element to the circumference of the position element is selected such that
when the position element is completely encompassed by the guide element in the target image,
the vehicle is situated in the charging position, wherein in the charging position the position of the secondary charging unit relative to the primary charging unit has an offset of the secondary charging unit with respect to the primary charging unit in an x-direction and a y-direction of the vehicle, which offset is not greater than a predefined maximum offset.

6. The method according to claim 1, wherein
a ratio of the circumference of the guide element to the circumference of the position element is selected such that
when the position element is completely encompassed by the guide element in the target image,
the vehicle is situated in the charging position, wherein in the charging position the position of the secondary charging unit relative to the primary charging unit has an offset of the secondary charging unit with respect to the primary charging unit in an x-direction and a y-direction of the vehicle, which offset is not greater than a predefined maximum offset.

7. The method according to claim 6, wherein
the guide element and the position element are embodied as ring-shaped or circular, wherein a difference between a diameter of the guide element and a diameter of the position element represents a tolerance measure, and
the tolerance measure correlates with the predefined maximum offset.

8. The method according to claim 1, wherein when the position element is completely encompassed by the guide element in the target image, indicating that the vehicle is situated in the charging position, a manifestation of the target image, guide element, and/or position element is different than when the position element is only partly encompassed or not encompassed by the guide element in the target image.

9. The method according to claim 1, wherein when the position element is completely encompassed by the guide element in the target image, an acoustic signal is reproduced indicating that the vehicle is situated in the charging position.

10. The method according to claim 1, wherein
the target image is embodied as a top-view image, and
a vehicle is inserted into the target image, wherein
the position of the vehicle element in the target image indicates the position of the secondary charging unit relative to the vehicle.

11. The method according to claim 10, wherein the top-view image is an image of the vehicle environment which is captured in real-time by the camera system and is converted into the top-view image.

12. A vehicle comprising a vehicle-integrated secondary charging unit configured to inductively charge the vehicle at a vehicle-external primary charging unit, the vehicle further comprising a camera system, a display device and a position determining means for determining a position of the secondary charging unit relative to the primary charging unit, wherein the vehicle is configured to:
a) capture a real-time image of a vehicle environment using the camera system, wherein the primary charging unit is included in the real-time image;
b) displaying the real-time image on the display device;
c) inserting at least one guide line into the real-time image, wherein
the direction and/or curvature of the guide line coincides with a steering angle lock of the vehicle such that the guide line corresponds to a trajectory of the vehicle in the case of the steering angle lock, and wherein
the position of the at least one guide line in the real-time image of the vehicle environment is selected such that the guide line indicates a movement curve of the secondary charging unit of the vehicle;
d) indicate the movement curve of the secondary charging unit relative to the primary charging unit based on a movement of the vehicle by repeating steps a) to c);
e) display a target image on the display device;
f) ascertain a position of the primary charging unit relative to a position of the secondary charging unit by the position determining means;
g) insert a guide element into the target image and insert a position element into the target image, wherein the position of the guide element and the position of the position element on the target image indicate the ascertained position of the secondary charging unit relative to the primary charging unit; and
h) indicate a change in position of the secondary charging unit relative to the primary charging unit in the target image depending on the movement of the vehicle by repeating steps e) to g).

* * * * *